June 22, 1965  R. L. NEAL  3,190,246
MACHINE FOR PLANTING PLANT RHIZOMES OR STOLONS
Filed June 4, 1962  5 Sheets-Sheet 1

Robert Lee Neal

June 22, 1965  R. L. NEAL  3,190,246
MACHINE FOR PLANTING PLANT RHIZOMES OR STOLONS
Filed June 4, 1962  5 Sheets-Sheet 5
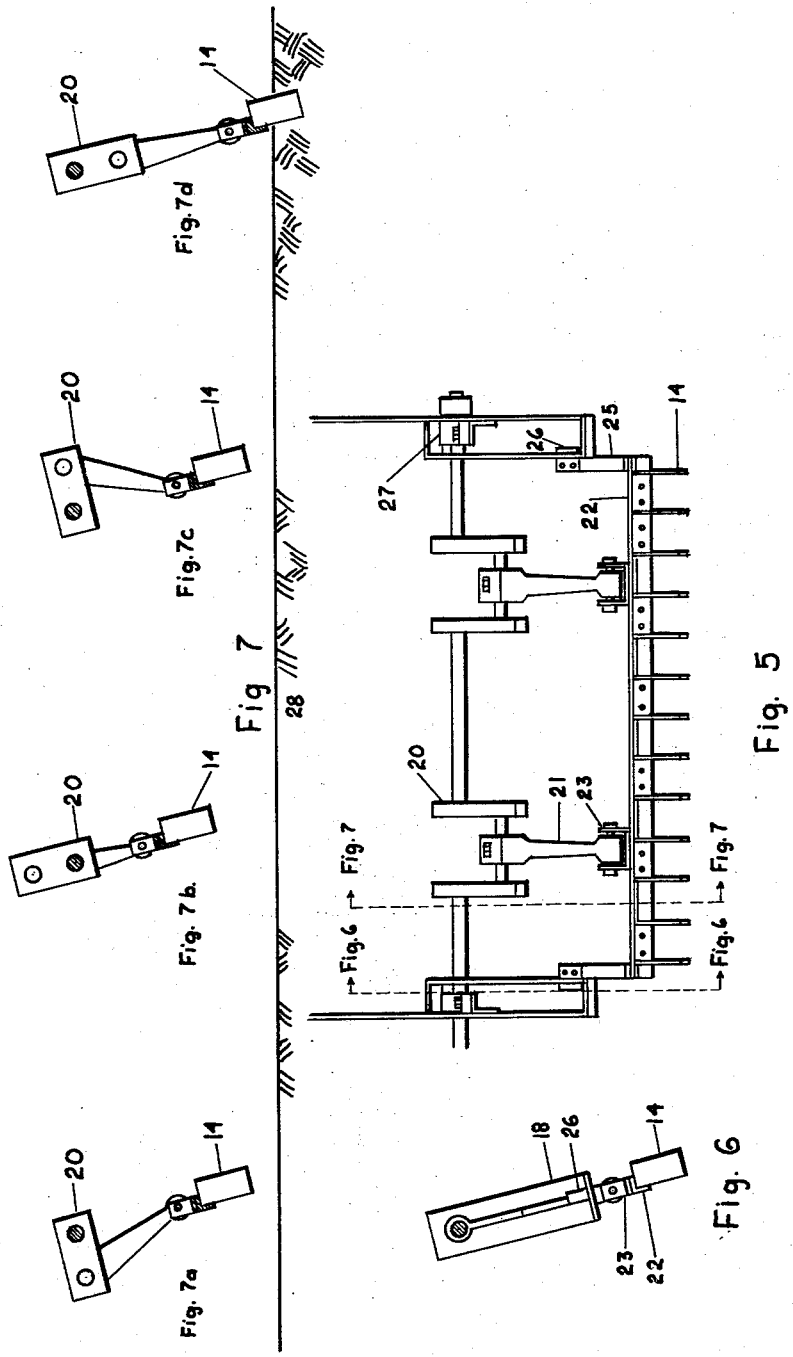

United States Patent Office 3,190,246
Patented June 22, 1965

3,190,246
MACHINE FOR PLANTING PLANT
RHIZOMES OR STOLONS
Robert Lee Neal, 2025 Wellington Road,
West Palm Beach, Fla.
Filed June 4, 1962, Ser. No. 199,700
3 Claims. (Cl. 111—1)

The present invention generally relates to the mechanical planting of grasses propagated by rhizomes or stolons and more particularly to a machine particularly constructed to plant pieces of rhizomes or stolons of long grasses in order to establish lawns for beautification and erosion control.

The planting of the rhizomes or stolons is accomplished by taking sod that has been cut approximately 2" deep and running it through a shredder thereby cutting it into pieces approximately 2½" to 3" long. These pieces are placed into the bin of the machine in a heterogeneous mass. The bottom of the bin is a revolving drum with a row of teeth which catch the grass and cast it upon the ground in a random manner. The speed of the drum and the forward movement of the machine determines the amount of stolons or rhizomes deposited upon the ground.

The grass deposited on the ground is then pushed into the soil by a row of planting fingers attached to a bar which is moved up and down by an eccentric shaft. The shaft revolves once each two inches the machine moves forward so as to provide a continuous coverage of pushing strokes 2½ inches wide, sufficient to strike and insert some part of the rhizome or stolon into the soil. The machine receives its forward motion from a roller that serves not only to support the machine, but to also close the openings made in the soil, thereby packing the soil around the rhizomes or stolons.

The object of the machine is to make posssible the closer planting of rhizomes and stolons in order to establish a new turf more quickly and economically. The hand planting of rhizomes and stolons on 2½ x 2" centers costs more than the laying of sod. The machine will also make the laying of sod unnecessary in a great many of the instances where sodding is now employed, as quicker coverage will be more easily achieved by the close planting of the rhizomes and stolons by machine than by hand-planting. This will save a great deal of labor involved in the laying of the sod.

By employing the machine of the present invention, the established sod will be lifted and shredded in the machine and the soil deposited back onto the field thereby saving transportation and handling costs of the soil which is necessary when transporting sod thereby providing a highly economical operation as well as one which establishes a lawn in a rapid and efficient manner.

The machine will also be effective in planting large areas quickly and economically, with a coverage of rhizomes and stolons commensurate with available funds.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a front view of the eccentric shaft with planting bar assembly.

FIG. 6 is a plant bar guide and planting bar assembly.

FIG. 7 is a movement sequence progressive view of the planting bar assembly as actuated by the eccentric shaft.

Figure 1:
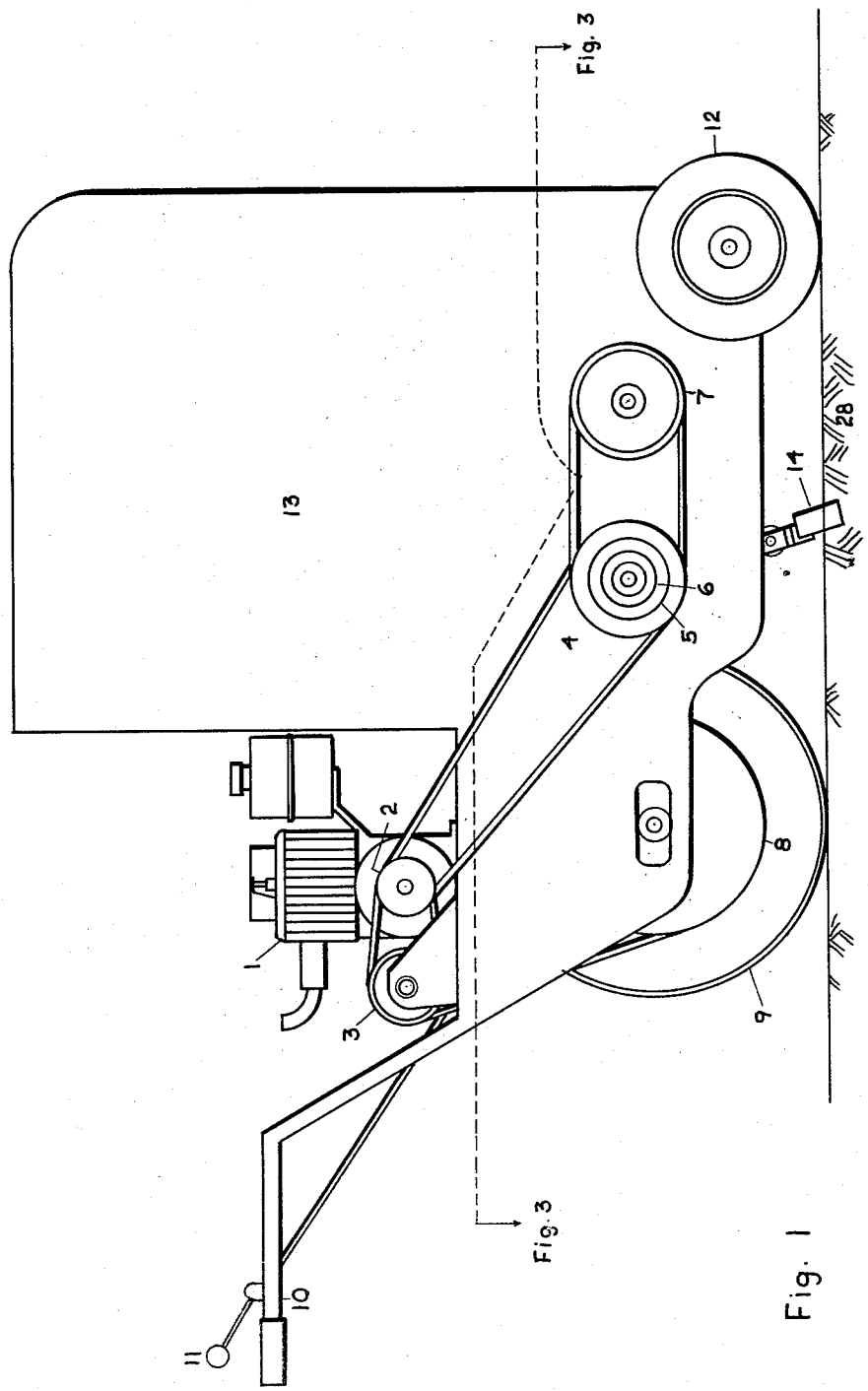
FIG. 1 is a side view, indicating the basic conformation of the machine and transmission of power to operating parts.
Figure 2:
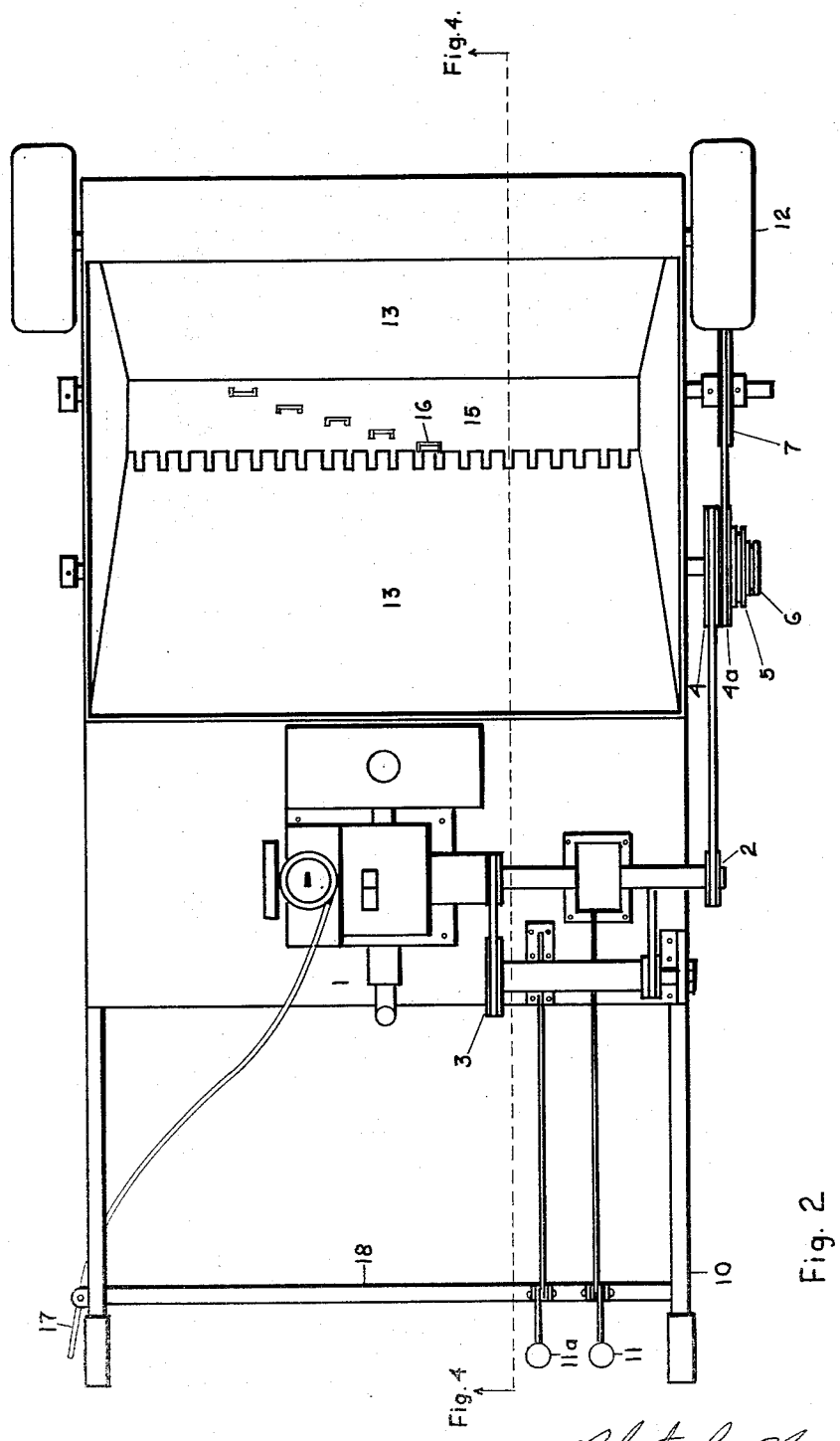
FIG. 2 is a top view, showing the bin, spreading drum, spreading teeth and power transmission.
Figure 3:
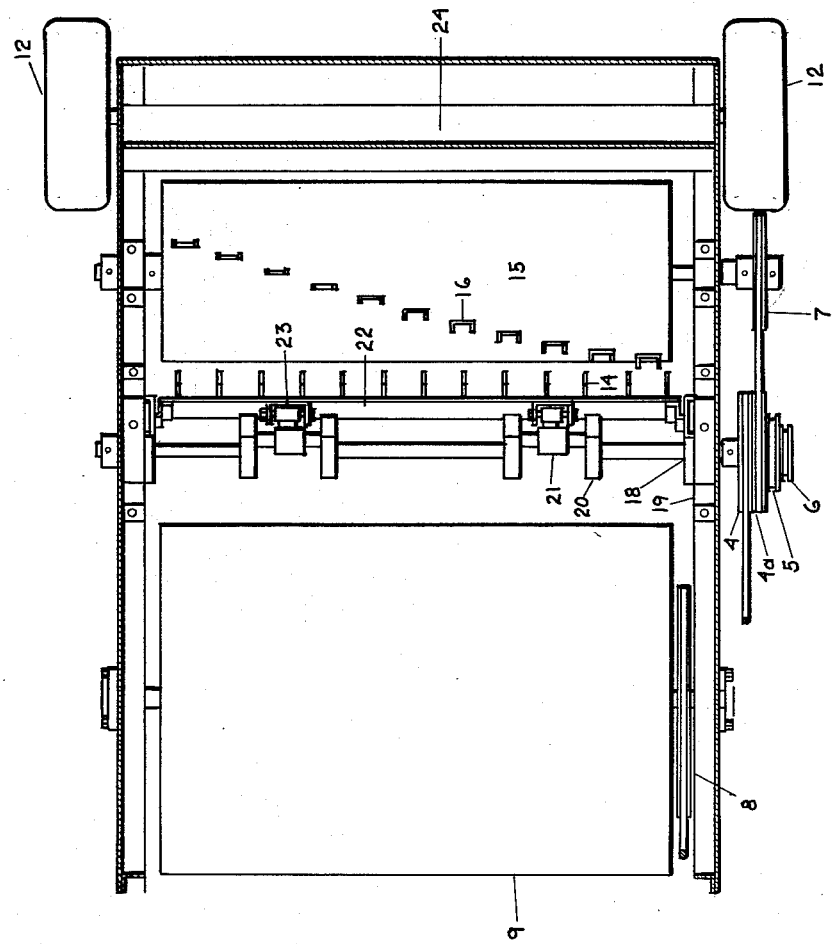
FIG. 3 is a section through FIG. 1 along section line 3—3 showing the spreading drum, spreading teeth, eccentric shaft with the planting bar assembly and the roller.
Figure 4:
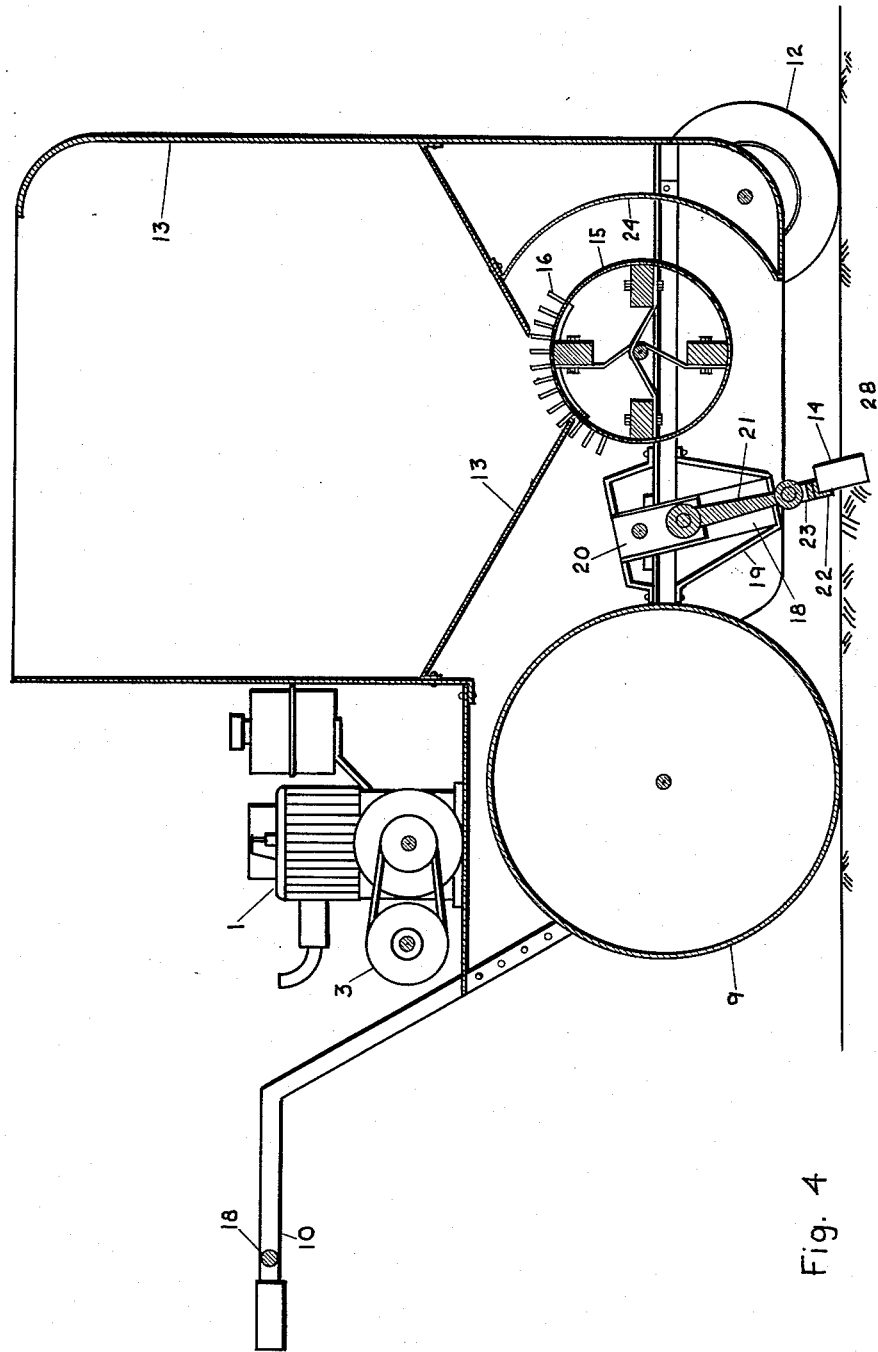
FIG. 4 is a section through FIG. 2 along section line 4—4 showing the relationship of the bin, spreading drum, eccentric shaft, planting bar assembly and roller.

The machine of the present invention generally consists of a carriage of ¼" angle iron with 1½ inch flange. The carriage is supported by the roller 9 and two 12 inch pneumatic tires 12. The carriage supports the spreading drum or roller 15 and eccentric shaft 20 by means of pillars 27 at either end of their shafts. The shafts are held in position by collars and the collars are held in position by set screws which fit into a recess drilled in the shaft.

The machine is powered by a five-horse motor 1 which drives the roller approximately 54 revolutions per minute, or 3,888 inches per minute. The eccentric shaft 20 is rotated by a 7.3 inch pulley 4 affixed to the end of the shaft and operates at 1944 revolutions per minute or so that the planting fingers 14 will strike the ground 28 approximately two inches on center. The eccentric shaft 20 is connected to the spreading drum 15 by means of one of three pulleys: a 7.3 inch pulley 4a to operate the spreading drum 15 at the same revolutions per minute as the eccentric shaft, a 4.8 inch pulley 5 to operate the drum at 1296 revolutions per minute or one revolution each 3 inches the machine moves forward, or a 3.6 inch pulley 6 to operate it at 972 revolutions per minute or one revolution each 4 inches the machine moves forward.

The spreading drum 15 is constructed of 15 gauge sheet metal and is connected to the shaft by means of spokes bolted to the shaft and drum support bars. The spreading teeth 16 are fixed to the drum 15 by a mounting bar attached to the drum support bars. The teeth 16 are located at intervals of 8 degrees around the drum 15. The teeth 16 are of U shape, 1¼" long, 1½" wide and are made of ¼" steel stock. The teeth 16 are placed 3" on centers in one line across the drum 15.

The eccentric shaft 20 is constructed of a 1" steel shaft with a 5½" throw, centered 16½" apart. The eccentric shaft 20 is connected to the planting bar 22 by connecting rods 21 constructed of standard automobile piston rods with a babbitt bushing at the top and a brass bushing at the bottom. The planting bar 22 is constructed of ⁹⁄₁₆" angle iron with a 1¼" flange. Brackets 23 to attach the connecting rod to the planting bar are constructed of ¼" stock 2½" by 2". The connection is made with a ½" bolt.

The planting fingers 14 are constructed of ⅛" stock. They are 3" by 2" by 2½" and are attached to the planting bar by bolts. The pairs of fingers 14 are located on the planting bar 22 2½" on center.

The planting bar 22 is positioned by guide plates 18 10¼ by 3 by 2⅜" constructed of ¼" stock. A ⅜" channel is cut through the center of the guide plate 18 with a ¾" radius hole at the top of the channel to allow the eccentric shaft 20 to pass through. The guide plates 18 are secured to the carriage frame by support brackets of ¼" stock welded to the guide plate 18 and bolted to the frame. The planting bar 22 is attached to the guide plate 18 by a 4½" by 1" hanger 25 bolted to the planting bar 22. The hanger 25 is secured to the guide plate 18 by means of a guide plate channel slide 26. The slide 26 is L shape 1½" x 1½" x 1" of ⅜" stock, honed to slide easily in the channel.

To use the machine, disengage both clutches 11 and 11a and start the motor 1. Engage roller 9 and move the machine into position. Place heterogeneous mass of stolons into the bin 13 and engage roller 9 and eccentric shaft 20 and move machine over area to be planted. The machine can be turned by pushing down on the steering bars 10 and applying pressure to either side of the machine.

The machine is based on the principle of vegetative reproduction. A piece of a grass rhizome or stolon inserted into the soil will grow, depending on soil conditions and weather. The machine spreads the grass on the ground and the planting fingers 14 push the stolons into the ground 28. The planting operation is completed by the roller 9 which closes the opening made in the soil and packs the soil around the rhizomes or stolons.

The machine is approximately 75" long, 51 inches high and 46" wide (FIG. 1). The machine is powered by a gasoline motor 1. The machine is moved by a 22" roller 9 driven from pulley 8 and the front end is supported by two 12" pneumatic tires 12. Operation of the machine is controlled by two clutch handles 11 and 11a. The main operating parts of the machine are the spreading drum or roller 15, the eccentric shaft 20, the planting bar 22, the planting fingers 34 and the roller 9.

The grass is placed into the bin 13. The bottom of the bin 13 is formed by the spreading drum 15. The area of the exposed drum is 32" x 4½". Mounted on the spreading drum 15 which is turned by a pulley 7, is a row of teeth 16, which pulls the grass from the bin 13. The grass is directed to the ground by the chute baffle 24. The grass is planted by the planting fingers 14, which are attached to the planting bar 22 which is actuated by the eccentric shaft 20. The shaft is connected to the planting bar by connecting rods 21 and connecting rod brackets 23. The planting bar is positioned by guide plates 18 which are connected to the planting bar by the channel guide 26 and the hanger 25. The guide plate is attached to the carriage by support brackets 19. The planting bar operates in an up and down motion as shown in FIG. 7, a, b, c, and d, plunging into the soil 28. The eccentric shaft is attached to the power by two pulleys 4 and 2 and the shaft is connected to the spreading roller through one of three pulleys 4a, 5 and 6.

The machine moves forward on the motion of the roller 9, which receives power through pulleys 8 and 3. The machine is maneuvered through the steering bars 10 and 18. Its forward speed is regulated by lever 17.

Various conventional details have not been illustrated including the exact details of the collar structure for retaining the shaft in proper longitudinal relation to the pillars and also the tension adjusting mechanism for the drive belts as well as any other conventional type of speed change mechanism which may be employed for driving the relative rotational speeds of the various shafts.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A machine for planting plant rhizomes or stolons comprising a bin for containing a mass, a spreading drum forming at least a part of the bottom of the bin for removing rhizomes or stolons from the bin and discharging them on the ground surfaces in a random manner, and a planting bar mounted rearwardly of the spreading drum and including a plurality of reciprocating members for pushing the rhizomes or stolons into the ground surface, a trailing roller located rearwardly of the spreading drum and reciprocating members for packing soil around the rhizomes or stolons which have been inserted into the ground, said drum including a plurality of radially projecting teeth extending into the bin and rotatable with the drum for dispensing rhizomes or stolons from the bin onto the ground surface, said reciprocating members being mounted on a rigid planting bar, a drive shaft having eccentrics thereon, rods connecting the eccentrics to the planting bar, guide means for the planting bar for guiding the movement of the planting bar in generally a vertical direction, said planting bar including a plurality of planting fingers thereon having a very small transverse dimension while having a relatively long longitudinal dimension for enabling the fingers to engage a rhizome or stolon laying on the ground surface and force it into the ground surface during movement of the planter.

2. The structure as defined in claim 1 wherein said roller supports the rear of the bin, the forward end of the bin being supported by a pair of ground engaging wheels, handle bar control means connected with the bin whereby the machine may be pivoted about the roller with the roller then acting as a support during turning movement of the planter.

3. The structure as defined in claim 2 together with an internal combustion engine supported on the planter and drivingly connected to the packing roller, the spreading drum and the eccentric shaft.

References Cited by the Examiner

UNITED STATES PATENTS

| | | | |
|---|---|---|---|
| 746,654 | 12/03 | Adair | 111—1 |
| 1,592,250 | 7/26 | Yerkes | 111 Methods |
| 1,972,325 | 9/34 | Acasio | 111—3 |
| 2,661,708 | 12/53 | Pittman | 111—1 |
| 2,682,824 | 7/54 | Bowser | 111—3 X |
| 2,701,616 | 2/55 | Cooper | 111—3 X |
| 2,887,075 | 5/59 | Linkogel | 111—85 X |
| 2,889,959 | 6/59 | Landgraf | 111—3 X |

FOREIGN PATENTS

| | | |
|---|---|---|
| 408,370 | 4/34 | Great Britain. |
| 581,249 | 8/58 | Italy. |

ABRAHAM G. STONE, *Primary Examiner.*

A. JOSEPH GOLDBERG, WILLIAM A. SMITH III, *Examiners.*